United States Patent [19]

Palm et al.

[11] 4,205,811
[45] Jun. 3, 1980

[54] DRONE LANDING BAG

[75] Inventors: Lorenz A. Palm; David B. Webb, both of Fort Erie, Canada

[73] Assignee: Irvin Industries Canada Ltd., Fort Erie, Canada

[21] Appl. No.: 964,414

[22] Filed: Nov. 28, 1978

[51] Int. Cl.² .......................................... B64C 25/58
[52] U.S. Cl. ............................. 244/100 A; 182/137; 188/266; 244/138 R; 280/736
[58] Field of Search ................ 244/100 A, 138 R, 99; 188/298, 266; 267/118; 293/107, 133; 280/736, 743; 5/469; 182/137; 251/DIG. 3; 137/512.15

[56] References Cited

U.S. PATENT DOCUMENTS 2,958,487 11/1960 Fraebel ............................ 244/138 R
3,937,488 2/1976 Wilson et al. ....................... 280/736

Primary Examiner—Barry L. Kelmachter
Attorney, Agent, or Firm—Beveridge, DeGrandi, Kline & Lunsford

[57] ABSTRACT

An inflatable landing bag having a valve for release of the inflating fluid from the landing bag as the pressure of the inflating fluid of the landing bag rises above a given level, such valve including a sleeve comprised at least in part of a woven stretch fabric having interstitially variable inflating fluid porosity such as to control release of inflating fluid from the landing bag.

9 Claims, 8 Drawing Figures

HEAVY DRONE INTERNAL
BAG PRESSURE_
 1_ STRETCH FABRIC ORIFICE
 2_ STANDARD SIZE OPEN ORIFICE
 3_ RESTRICTED SIZE OPEN ORIFICE

DRONE LANDING BAG

BRIEF SUMMARY OF THE INVENTION

This invention relates to improvements in landing bags of the type designed to cushion the ground impact landing shock of an airborne drone.

It has long been a problem to adequately cushion the ground impact landing shock of an airborne drone, such as in the case of material and supplies that are delivered by parachute drop from an aircraft. The most basic problem has been to design and construct an inflatable landing bag that will cushion the drone so that it will not penetrate into the bag to such an extent as to bottom out and impact on the ground, and yet will maintain the forces of drone deceleration within acceptable limits. Since the inflatable landing bag is basically a cushion, and unless the resiliency of the same is not almost instantaneously reduced as the drone penetrates into the bag, the resultant rebound or bounce of the landing bag is such as to be unacceptable. Since most inflatable landing bag uses will be by way of a parachute drop, the parachute substantially collapsing on ground impact, a high incidence of rebound may result in tipping or overturning of the landing bag such that the drone supported thereby will be damaged by directly impacting against the ground as it secondarily returns to the ground.

It is accordingly a primary object of this invention to provide an inflatable landing bag having a maximum stroke landing drone penetration without impacting the ground through the landing bag, acceptable limits of drone deceleration, and minimum incidence of rebound.

Since, for all practical purposes, it is impossible to completely eliminate rebound, the inflatable landing bag must have a sufficient residual resilience, after initial ground impact, to cushion the drone from secondary ground impact shocks as it settles from rebound. It is accordingly a further object of the invention to provide an inflatable landing bag which retains sufficient resiliency after initial ground impact to cushion the drone from rebound ground impact.

As shown by the prior art, the problems associated with use of inflatable landing bags have generally been sought to be solved by providing the same with a relief valve orifice for permitting release of the inflating fluid thereof when the inflating fluid pressure exceeds a certain point. In such previously provided devices, the size of the opening of such relief valve orifice is, in some instances, relatively fixed, as in U.S. Pat. No. 2,713,466, or moderately variable, as in U.S. Pat. Nos. 2,958,487 and 2,964,139 and, in all instances, once open, remain open. If such orifice is restricted, or has late release, the incidence of rebound will be excessive and, if enlarged, may not retain sufficient inflating fluid to adequately stop the drone from penetrating into the landing bag and bottoming out on ground impact. In the moderate orifice size variation sought by the prior art, total reliance therefor is dependent on one or two elastic bands, the failure of which will totally destroy the regulative design characteristics thereof.

In contradistinction to such relief valves of the prior art, we have provided a landing bag relief valve which comprises a cylindroid of woven stretch fabric providing multiple interstitial release of the inflating fluid from the landing bag.

We are aware that others have previously used woven stretch fabric to provide for controlled relief of the inflating fluid pressures of an inflatable bag, such as shown in U.S. Pat. Nos. 3,603,430 and 3,937,488. However, the inflatable bag construction of these prior art devices is unsuitable for use in a drone landing bag designed for airborne equipment delivery, since such equipment will frequently be loaded in a manner to rest directly on the inflated bag and the weight of the equipment, combined with bounding thereof on the landing bag in normal flight of the aircraft, would cause premature release of the inflating fluid from the bag, quite possibly reducing the inflating fluid pressure thereof to such an extent that the bag is not functionally operative to cushion the equipment from landing shocks when the bag impacts against the ground. In other words, landing bags according to the present invention are necessarily of the type which provide an envelope that is normally impervious to the inflating fluid thereof, inflating fluid pressure relief thereof being provided by the woven stretch fabric valve member only after initial ground impact.

Other objects and advantages of the invention will become apparent from the following detailed description, taken in connection with the accompanying drawings, and in which drawings:

DETAILED DESCRIPTION

Figure 1:
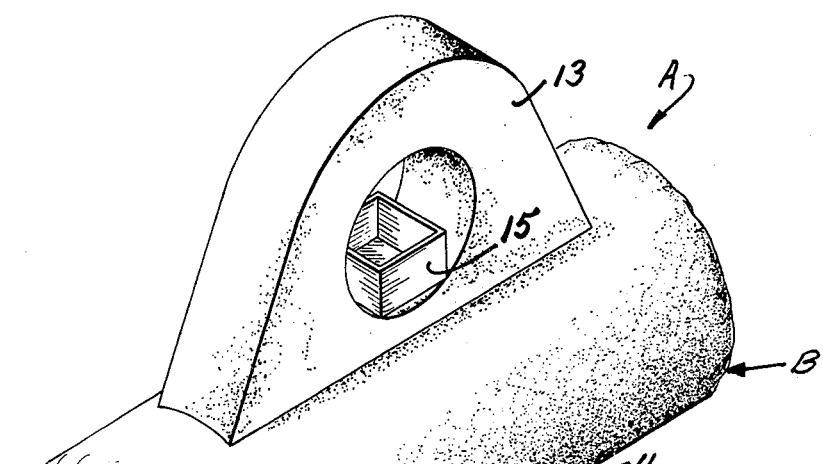
FIG. 1 is a perspective view of an inflatable landing bag according to the present invention.

In the drawings, wherein similar reference characters are used to designate corresponding parts throughout the several views, and wherein is shown a preferred embodiment of the invention, the letter A may generally designate our improved landing bag, having a main body portion B, and provided with valve means C. Landing bag A may be configured to any desired shape, polygonal, cylindrical, or otherwise. Also, landing bag A may be provided with various types of fastening means (not shown) for attachment thereto of a parachute or other lowering device and for positioning of a drone thereon. In the form shown in the drawings, main body portion B of landing bag A includes an elongated cylindrical portion 11 provided with an arch-like member 13, within which drone 15 may be mounted. Landing bag A is comprised of material that is impervious to the inflating fluid therein contained, usually air, and may be provided with an inflating valve 16 for inflation thereof.

As shown, valve means C may be provided at one end of elongated cylindrical portion 11 of main body portion B of landing bag A. Of course, valve means C may be otherwise located on landing bag A, and more than one valve means C may be provided, according to the uses for which the landing bag is designed.

In accommodation of valve means C, main body portion B is provided with a sized orifice 20, through which the inflating fluid of landing bag A may be released. An annular band 21, which is of a material impervious to the inflating fluid of landing bag A, and having a central opening 22 therethrough, defined by the inner diameter thereof, which inner diameter is preferably of substantially the same as and congruent with respect to the diameter of sized orifice 20, may be attached about the outer periphery thereof to main body portion B, as at 23, to provide, with that portion of main body portion B adjacent sized orifice 20, a pocket 24, within which may be received the outer peripheral portion of blow-out patch 28, in a manner to provide a labyrinth type seal preventing release of the inflating fluid of landing bag A through sized orifice 20 thereof.

Blow-out patch 28 is preferably of a sufficiently pliant material, such as polyurethane foam, so that, unless otherwise restrained, it may be deformed and literally blown through central opening 22 of annular band 21 by the pressure of the inflating fluid within landing bag A.

Figure 2:
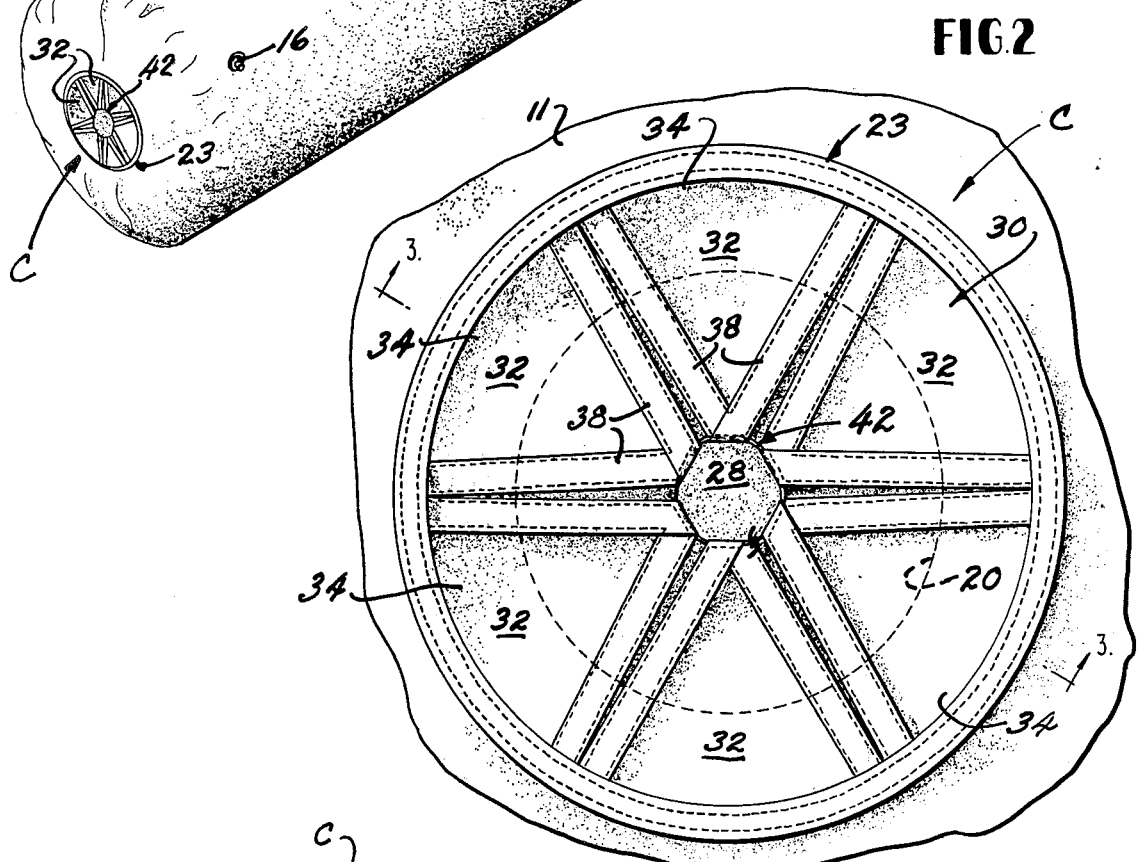
FIG. 2 is an enlarged fragmentary plan view of the left hand end of the landing bag shown in FIG. 1.

Attaching means 30 is provided for retaining blow-out patch 28 in situ as a cover over sized orifice 20 to prevent release therethrough of the inflating fluid of landing bag A. Attaching means 30 preferably comprises a member having a plurality of shaped flap means 32, each such flap means 32 being of a generally triangular shape, the base end 34 thereof being attached to main body portion B of landing bag A, again as at 23, and the apex of which comprises a free end 35, the free ends 35 thereof converging toward each other to the center of sized orifice 20 and with each side edge thereof proximate to the side edge of the next adjacent flap means 32, as shown in FIG. 2.

A reinforcing band 38 may be provided along the side edges of each flap means 32, each reinforcing band 38 being folded at the free end 35 of each flap means 32 to provide a loop 40 for receiving tie means 42.

Tie means 42 preferably comprises a tie cord that is frangible on increase of the pressure of the inflating fluid of landing bag A above a given level. We have found a tie cord of 2.5 psi static break to be suitable.

Figure 3:
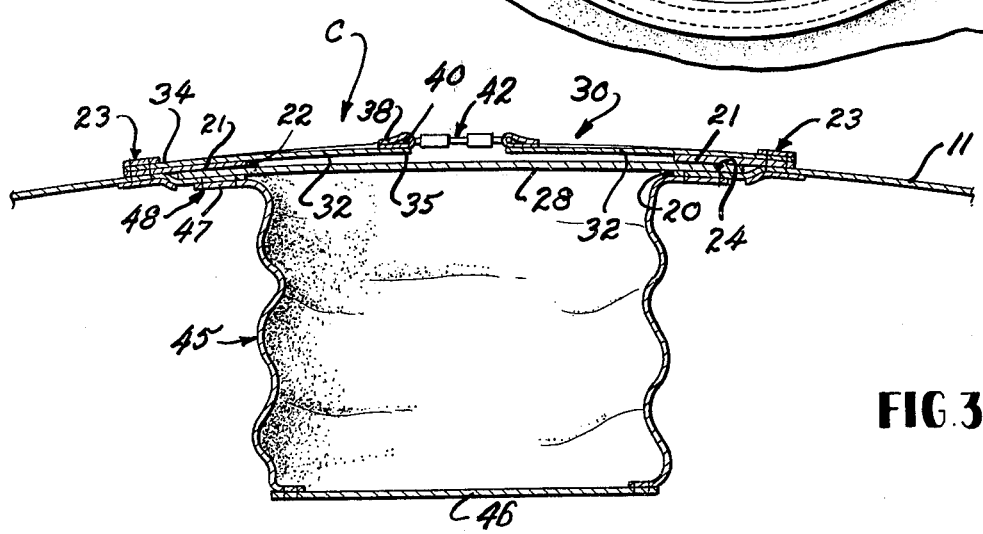
FIG. 3 is a transverse sectional view taken substantially along the line 3—3 of FIG. 2.

Valve means C preferably comprises sleeve means 45, which may be of a cylindroidal shape, having a closed end 46 and an open end 47. As shown in FIG. 3, open end 47 of sleeve means 45 is preferably peripherally attached about the periphery of sized orifice 20, as at 48, and normally depends within landing bag A. The length of sleeve means 45, from closed end 46 to open end 47, is related to the diameter of sized orifice 20 in that the ratio of the length of sleeve means 45 to the diameter of sized orifice 20 should preferably not exceed 3:1. That is, a sleeve means in the nature of a long hose is to be avoided.

All, or only a part of sleeve means 45 may be comprised of a woven stretch fabric. In this regard, the area of the woven stretch fabric thereof is preferably at least equal to the area of sized orifice 20.

Figure 5:
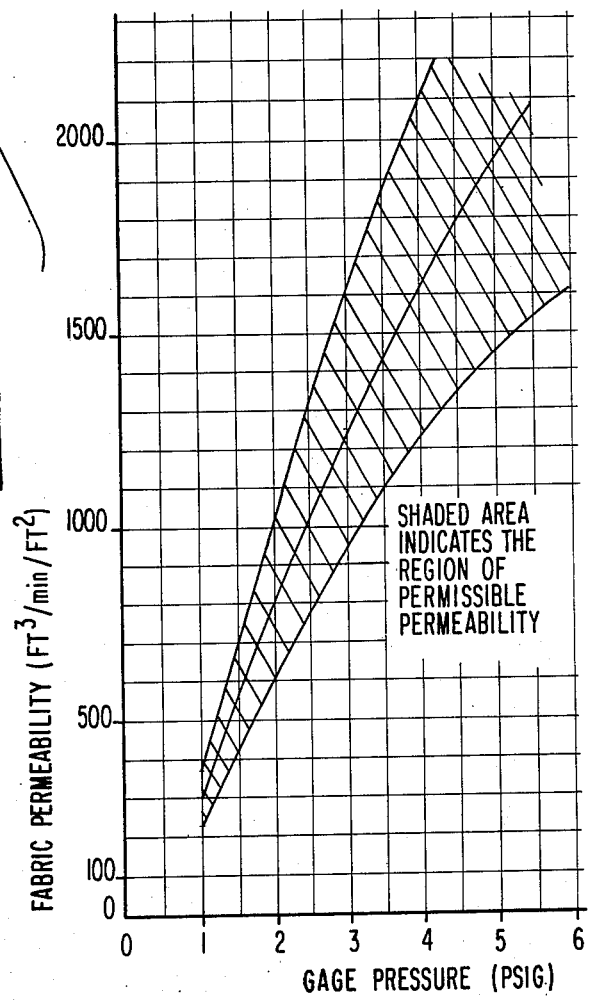
FIG. 5 is a graph showing a region of acceptable inflating fluid permeability of the woven stretch fabric of our improved landing bag.
Figure 6:
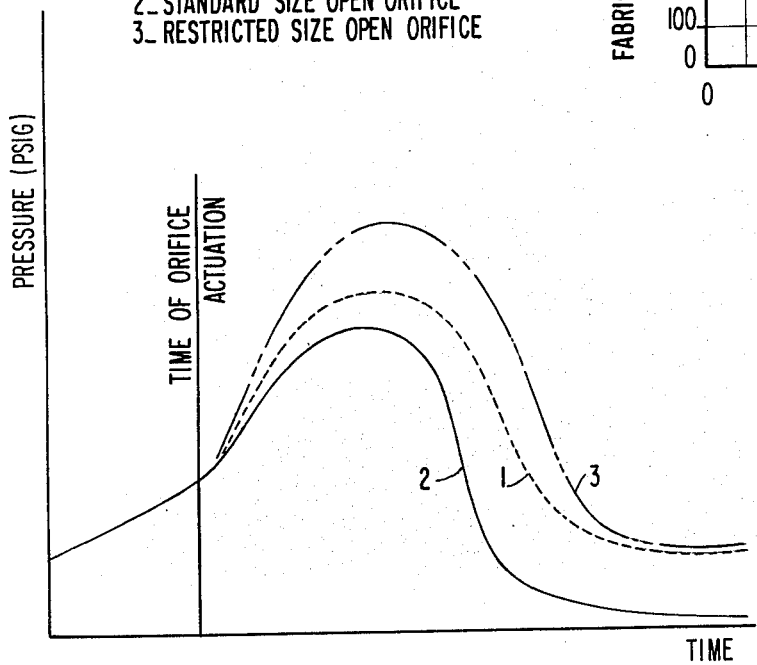
FIGS. 6-8 are graphs showing certain characteristics of our improved inflatable landing bag as compared to inflatable landing bags of the prior art.
Figure 7:
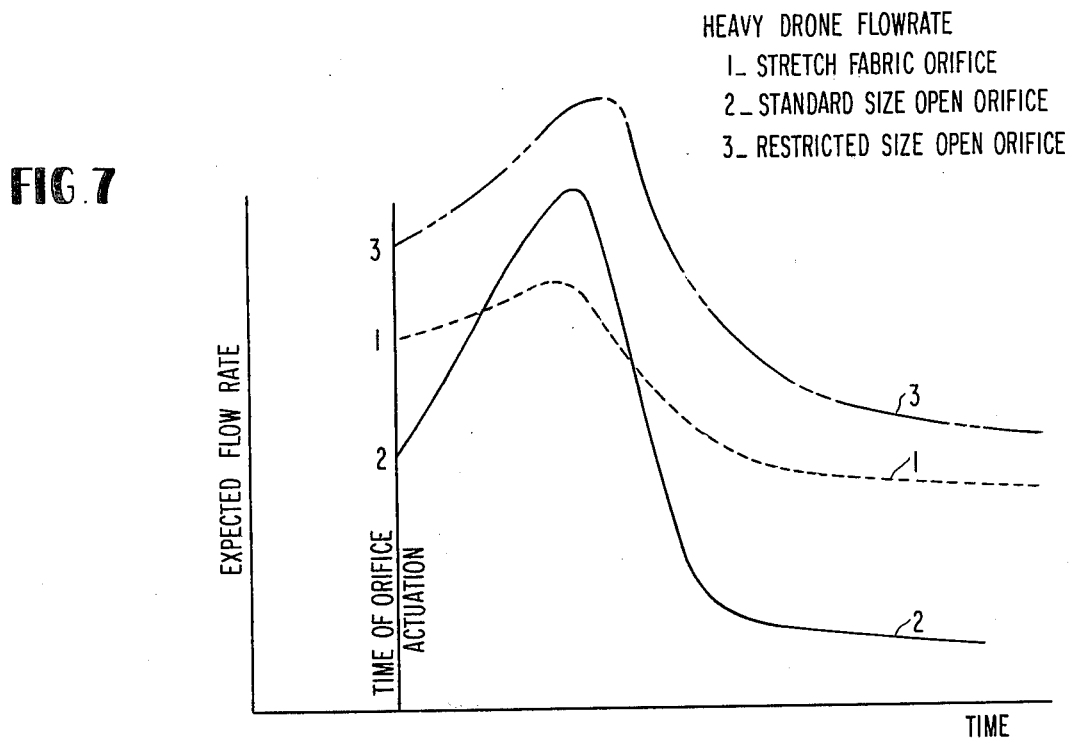
Figure 8:
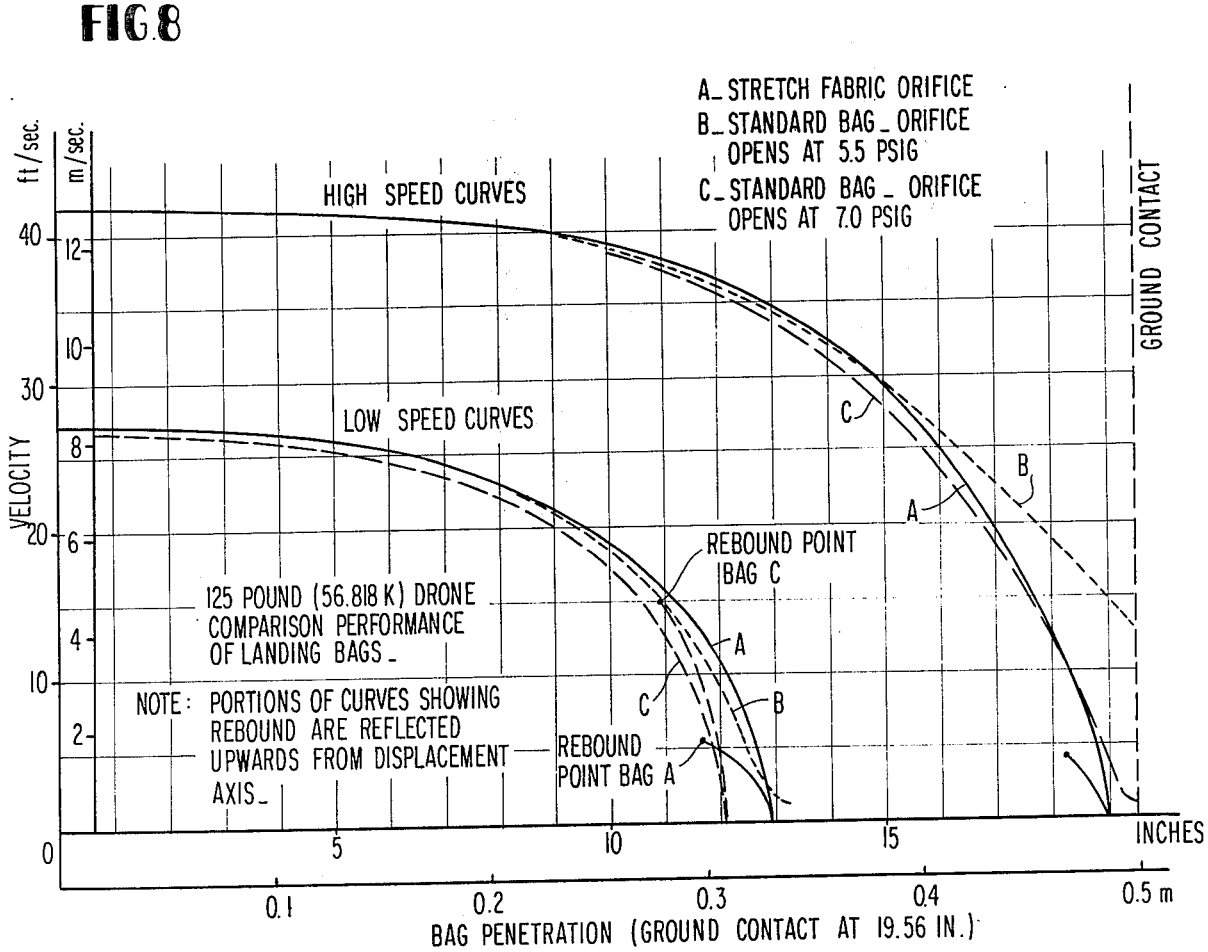

As to suitable woven stretch fabric of which at least a part of sleeve means 45 may be comprised, the same should preferably include a plurality of threads of stretch yarn extending in at least one direction for elongation of the woven stretch fabric so that inflating fluid porosity thereof is increased in relation to increases in the pressure of the inflating fluid and should have a minimum tensile strength of at least three hundred sixty pounds per inch in the warp direction and two hundred forty pounds per inch in the fill direction, either one of which may be varied with respect to the other, so long as the total is at least six hundred pounds per inch; elongation at the breaking point of from forty-five percent to seventy-five percent in the warp direction and from ninety-five percent to one hundred forty-five percent in the fill direction; and an inflating fluid permeability profile substantially as shown in FIG. 5.

Ascertaining the parameters of optimum release of the inflating fluid of a landing bag is an extremely complex mechanical thermodynamic process which is dependent on a number of variables, such as the size of the drone in relation to the size of the landing bag, the weight of the drone, and the acceptable limits of the forces of deceleration for a given drone.

The desired permeability of the woven stretch fabric of sleeve means 45 is a function of the difference between the instantaneous inflating fluid pressure (Po) and the atmospheric pressure internally of the landing bag. If both of these pressures are measured in psia, then the differential (gauge) pressure is generally $p = Po - 14.7$. The permeability of the woven stretch fabric, and thus the rate of inflating fluid release from the landing bag at any instant is a function of p, as shown in the graph of FIG. 5. As expressed mathematically, the woven stretch fabric of sleeve means 45 is preferably configured to provide an inflating fluid porosity ($\lambda$) (cubic feet per minute per square foot) of substantially $$\lambda = 545(p - 0.05)^{0.86}$$

for pressures (p) that are substantially within the pressure range of from 1.0 psig to 15.0 psig, and $$\lambda = 300p$$

for pressures (p) less than substantially 1.0 psig.

As expressed in terms of minimum and maximum limits, the inflating fluid porosity ($\lambda$) (cubic feet per minute per square foot) of the woven stretch fabric of sleeve means 45 is preferably configured within a substantially maximum allowable limit of $\lambda = 375p$ and a substantially minimum required limit of $\lambda = 240p$ for pressures (p) that are substantially within the pressure range of from 0 to 1.0 psig, and a substantially maximum allowable limit of $\lambda = 612.5(p - 1) + 375$ and a substantially minimum required limit of $\lambda = 251.4(p - 1) + 240$ for pressures (p) that are substantially within the pressure range of from 1.0 psig to 15.0 psig.

Figure 4:
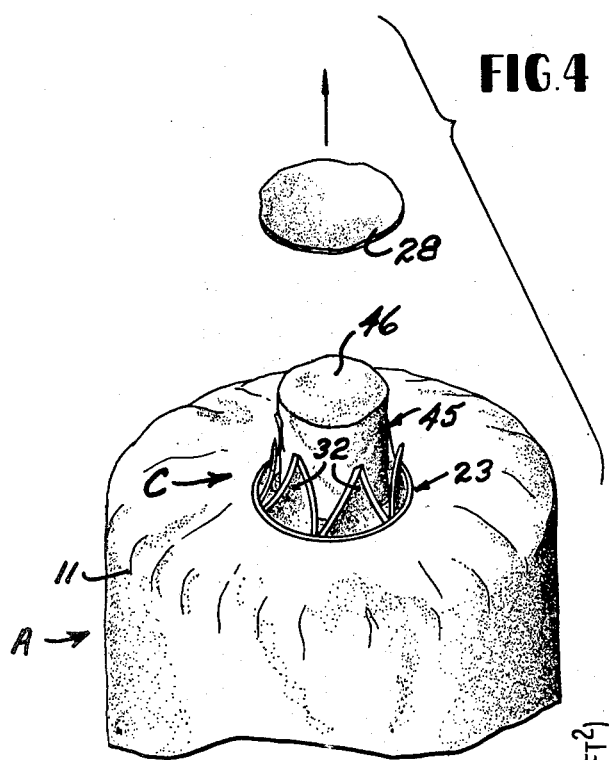
FIG. 4 is an enlarged perspective view of the left hand end of the landing bag of FIG. 1 in a condition of release of the inflating fluid from the landing bag.

On ground impact, drone 15 will penetrate into landing bag A and thereby cause an increase in the pressure of the inflating fluid within the landing bag, which will exert break forces on tie means 42 that are greater than the static break point for which the same has been designed, causing tie means 42 to snap or rupture. On rupture of tie means 42, the continuing instantaneous increase in pressure of the inflating fluid within landing bag A will force sleeve means 45 against blow-put patch 28, causing the same to deform to an extent to be literally blown through opening 22 of annular band 21, and projection and inversion of sleeve means 45 through sized orifice 20 and opening 22 to form a secondary closure for sized orifice 20 comprising a cupola-like protrusion extending externally of landing bag A, as shown in FIG. 4. At least part of the cupola-like protrusion of sleeve means 45 will be comprised of woven stretch fabric, and the continuing pressure of the inflating fluid within landing bag A will cause an increase in the porosity of the woven stretch fabric of sleeve means 45 for appropriate release of inflating fluid therethrough, within the parameters as previously described.

The graphs of FIGS. 5, 6, 7 and 8 represent a visual presentation of drone deceleration of our improved landing bag as compared to prior art landing bags of which we are aware. When viewing these graphs it must be borne in mind that drone deceleration is not a function of the inflating fluid pressure alone, but depends on the product $p \times A$, where p is the pressure of the inflating fluid and A is the area of contact between the landing bag and the drone at a particular depth of penetration of the drone into the landing bag. As the drone deflects the landing bag shape on penetration thereinto on ground impact, the landing bag will fold and be otherwise deflected in various complex ways which are untractable for practical mathematical description. The subject graphs were thus developed by methods of projected geometry as determined from a collation of progressive changes in landing bag shape dimensions for given drones and landing bags on ground impact.

Various changes may be made to the form of the invention herein shown and described without departing from the spirit of the invention and the scope of the following claims.

We claim:

1. An inflatable landing bag having a main body portion impervious to the inflating fluid of said bag, said main body portion including a sized orifice for release of inflating fluid from said main body portion, a blow-out patch of material impervious to the inflating fluid of said bag and configured to form a cover for said sized orifice, attaching means for positioning of said blow-out patch as a cover for said sized orifice in defining with said main body portion of said landing bag an inflatable receptacle impervious to the inflating fluid thereof, said attaching means being releasable on increase of the pressure of the inflating fluid of said landing bag above a given level, said blow-out patch being displaceable as a cover for said sized orifice on release of said attaching means, and valve means for regulating release of inflating fluid through said sized orifice, said valve means including a sleeve means comprising a cylindroid body portion having a closed end and an open end, said sleeve means being attached to said landing bag with the periphery of said open end extending about the periphery of said sized orifice to normally depend within said landing bag in juxtaposed relation to said sized orifice for inversion and projection thereof through said sized orifice by the inflating fluid pressure within said landing bag to thereby form a secondary closure for said sized orifice comprising a cupola-like protrusion extending externally of said main body portion of said landing bag on displacement of said blow-out patch as a cover for said sized orifice, at least a part of said protrusion being comprised of a woven stretch fabric of a porosity permeable to the inflating fluid of said landing bag and having a plurality of threads of stretch yarn extending in at least one direction for elongation of said woven stretch fabric so that inflating fluid porosity of said woven stretch fabric is increased in relation to increases in pressure of the inflating fluid.

2. An inflatable landing bag as specified in claim 1 wherein said closed end of said cylindroid body portion of said sleeve means is comprised of material impervious to the inflating fluid of said landing bag.

3. An inflatable landing bag as specified in claim 1 wherein said sleeve means is comprised substantially entirely of stretch fabric.

4. An inflatable landing bag as specified in claim 1 wherein the area of said protrusion comprised of a woven stretch fabric is at least equal to the area of said sized orifice.

5. An inflatable landing bag as specified in claim 1 wherein the length of said sleeve means, from said closed end to said open end thereof, in relation to the diameter of said sized orifice, does not exceed a ratio of 3:1.

6. An inflatable landing bag as specified in claim 1 wherein said attaching means comprises a plurality of shaped flap means having a base end attached to said landing bag and a free end, and including releasable tie means attached to said free end of said shaped flap means for retention thereof in juxtaposed attachment of said blow-out patch as a cover for said sized orifice.

7. An inflatable landing bag as specified in claim 6 wherein said tie means comprises a tie cord of a given tensile strength that is frangible on increase of the pressure of the inflating fluid of said landing bag above a given level.

8. An inflatable landing bag as specified in claim 1, 2, 3, 6 or 7 wherein the length of said sleeve means, from said closed end to said open end thereof, in relation to the diameter of said sized orifice, does not exceed a ratio of 3:1; the area of said protrusion comprised of a woven stretch fabric is at least equal to the area of said sized orifice; and the inflating fluid porosity ($\lambda$) (cubic feet per minute per square foot) of said stretch fabric comprises at least substantially $$\lambda = 545(p - 0.5)^{0.86}$$

for pressures (p) that are substantially within the pressure range of from 1.0 psig to 15.0 psig, and $$\lambda = 300p$$

for pressures (p) less than substantially 1.0 psig.

9. An inflatable landing bag as specified in claim 1, 2, 3, 6 or 7 wherein the length of said sleeve means, from said closed end to said open end thereof, in relation to the diameter of said sized orifice, does not exceed a ratio of 3:1; the area of said protrusion comprised of a woven stretch fabric is at least equal to the area of said sized orifice, and the inflating fluid porosity ($\lambda$) (cubic feet per minute per square foot) of said stretch fabric comprises a substantially maximum allowable limit of $\lambda = 375p$ and a substantially minimum required limit of $\lambda = 240p$ for pressures (p) that are substantially within the range of from 0 to 1.0 psig, and a substantially maximum allowable limit of $\lambda = 612.5(p - 1) + 375$ and a substantially minimum required limit of $\lambda = 251.4(p - 1) + 240$ for pressures (p) that are substantially within the pressure range of from 1.0 psig to 15.0 psig.

* * * * *